United States Patent
Steiner

(10) Patent No.: US 11,375,141 B1
(45) Date of Patent: Jun. 28, 2022

(54) ENDOSCOPIC CAMERA REGION OF INTEREST AUTOEXPOSURE

(71) Applicant: ARTHREX, INC., Naples, FL (US)

(72) Inventor: Michael Dominik Steiner, Goleta, CA (US)

(73) Assignee: ARTHREX, INC., Naples, FL (US)

( * ) Notice: Subject to any disclaimer, the term of this patent is extended or adjusted under 35 U.S.C. 154(b) by 0 days.

(21) Appl. No.: 17/171,946

(22) Filed: Feb. 9, 2021

(51) Int. Cl.
  *H04N 5/353* (2011.01)
  *G02B 23/24* (2006.01)
  *H04N 5/225* (2006.01)

(52) U.S. Cl.
  CPC ......... *H04N 5/353* (2013.01); *G02B 23/2461* (2013.01); *H04N 2005/2255* (2013.01)

(58) Field of Classification Search
  CPC ........... H04N 5/353; H04N 2005/2255; G02B 23/2461
  See application file for complete search history.

(56) References Cited

U.S. PATENT DOCUMENTS

| | | | |
|---|---|---|---|
| 6,865,028 B2 * | 3/2005 | Moustier | G03B 37/00 359/725 |
| 8,035,704 B2 * | 10/2011 | Hu | H04N 9/04515 348/246 |
| 9,413,976 B2 * | 8/2016 | DiCarlo | A61B 1/00006 |
| 9,462,192 B2 | 10/2016 | Kuriyama | |
| 9,770,163 B2 | 9/2017 | Ovod | |
| 9,986,169 B2 * | 5/2018 | Morales | H04N 5/357 |
| 10,512,512 B2 | 12/2019 | Richmond et al. | |
| 11,103,125 B2 * | 8/2021 | Koiso | A61B 1/00059 |
| 2005/0107701 A1 * | 5/2005 | Dubberstein | A61B 8/461 600/437 |
| 2007/0115386 A1 | 5/2007 | Wakabayashi | |
| 2010/0157139 A1 | 6/2010 | Velarde et al. | |
| 2012/0078044 A1 | 3/2012 | Yamaguchi et al. | |
| 2017/0064258 A1 | 3/2017 | Westwick et al. | |
| 2017/0354392 A1 | 12/2017 | Fengler et al. | |
| 2019/0082094 A1 | 3/2019 | Endo | |

FOREIGN PATENT DOCUMENTS

WO 2019181629 9/2019

* cited by examiner

*Primary Examiner* — Michael E Teitelbaum
(74) *Attorney, Agent, or Firm* — Karish & Bjorgum, PC

(57) ABSTRACT

An endoscopic camera system having a camera that captures and outputs an image; a camera controller coupled to the camera; a user input device coupled to the camera or the camera controller, wherein the user input device is usable to select a region of interest in the image, the region of interest being a sub-part of the image; and wherein the camera controller: computes a measured luminance value for the region of interest; and adjusts an exposure in response to a comparison of the measured luminance value with a target luminance value.

21 Claims, 5 Drawing Sheets

ENDOSCOPIC CAMERA REGION OF INTEREST AUTOEXPOSURE

BACKGROUND

The present disclosure relates to devices used in endoscopic surgery and, more particularly, to systems and methods for autoexposure of regions of interest in endoscopic camera images.

The wider the field of view (FOV) of an endoscopic optical system, the more visual information is presented to the surgeon. Uniformly illuminating the scene viewed by a wide FOV endoscope is challenging because light output tends to fall-off towards the perimeter of the field of view. Traditional autoexposure algorithms calculate luma using a center area of a scene as the center point. However, in a wide FOV application, the user may choose to digitally zoom-in or center-in on an area towards the periphery of the scene to better view a region of interest. If so, then given the light and optical properties at the edge of the scene/scope, the user may experience poor image quality (darker than normal) and poor responsiveness due to light changes at the periphery that would not adjust the overall scene exposure. Additionally, the exposure levels of the scene in the region of interest may be different than for the wide FOV as a whole. The lack of proper illumination and exposure response may result in an image that is distracting to the surgeon, may cause eye fatigue, and, may potentially lead to misidentification of tissue and anatomy.

There exists a need for an improved autoexposure system that remedies the shortcomings of the prior art.

SUMMARY

The present disclosure relates to an endoscopic camera system with an autoexposure system that remedies the shortcomings of the prior art by controlling autoexposure based on an area of interest selected by a user. In an implementation, an endoscopic camera system has a camera that captures and outputs an image; a camera controller coupled to the camera; and a user input device coupled to the camera or the camera controller. The user input device is usable to select a region of interest in the image, the region of interest being a sub-part of the image. The camera controller computes a measured luminance value for the region of interest; and adjusts an exposure in response to a comparison of the measured luminance value with a target luminance value. In an implementation, the luminance value is a weighted sum of at least one of: an average green intensity, an average red intensity, and an average blue intensity in the region of the interest. The luminance value may be a weighted sum of an average green intensity in the region of the interest. Adjusting the exposure may include adjusting at least one of an exposure time, a light source intensity, a gain, a sensitivity, and a variable aperture.

Optionally, the camera has a longitudinal axis and captures the image at a non-zero angle to the longitudinal axis. The camera may capture the image at a capture angle of 45 degrees relative to the longitudinal axis. In an implementation, the user input device is usable to select a region of interest having an apparent capture angle that is different than the actual capture angle. The camera may capture and output an image having a field of view greater than 90 degrees. In an implementation, the camera captures and outputs an image having a field of view of about 140 degrees. The user input device may be usable to select a region of interest having an apparent field of view that is smaller than the image field of view.

In an implementation the image has an image center and an orientation indicator; the region of interest has a region of interest center positioned at a fixed distance from the image center; and the camera controller changes the region of interest center based on changes in position of the orientation indicator. Adjusting the exposure may further comprise adjusting a gain of at least some pixels within the region of interest. Optionally, the gain adjustment is not uniform across all of the pixels within the region of interest. The pixel gains may be adjusted using a gradient depending on a position of the pixels from a center of the image.

According to an implementation, a method of adjusting an exposure for an imaging system, comprises: receiving an image from a camera; receiving a region of interest in the image from a user, the region of interest being a sub-part of the image; computing a measured luminance value for the region of interest; and adjusting an exposure in response to a comparison of the measured luminance value with a target luminance value. Computing the measured luminance value may further comprise computing a weighted sum of an average green intensity, an average red intensity, and an average blue intensity in the region of the interest. In an implementation, computing the measured luminance value further comprises computing a weighted sum of an average green intensity in the region of interest. Adjusting the exposure may further comprise adjusting at least one of an exposure time, a light source intensity, a gain, a sensitivity, and a variable aperture.

The image may be captured at an actual capture angle greater than zero relative to a longitudinal axis and the received region of interest may have an apparent capture angle that is different than the actual capture angle. In an implementation, the image has a field of view greater than 90 degrees and the received region of interest has an apparent field of view that is less than the image field of view.

In an implementation, the image further comprises an image center and an orientation indicator; the region of interest has a region of interest center positioned at a fixed distance from the image center; and the method further comprises calculating a new region of interest center based on a change in a position of the orientation indicator. Adjusting the exposure may further comprise adjusting a gain of at least some pixels within the region of interest. Optionally, the gain adjustment is not uniform across all of the pixels within the region of interest. Optionally, pixel gains are adjusted using a gradient depending on a position of the pixels from a center of the image.

These and other features are described below.

BRIEF DESCRIPTION OF THE DRAWINGS

The features, aspects and advantages of the present invention will become better understood with regard to the following description, appended claims and accompanying figures wherein:

DETAILED DESCRIPTION

In the following description of the preferred implementations, reference is made to the accompanying drawings which show by way of illustration specific implementations in which the invention may be practiced. Wherever possible, the same reference numbers will be used throughout the drawings to refer to the same or like parts. It is to be understood that other implementations may be utilized and structural and functional changes may be made without departing from the scope of this disclosure.

Figure 1:
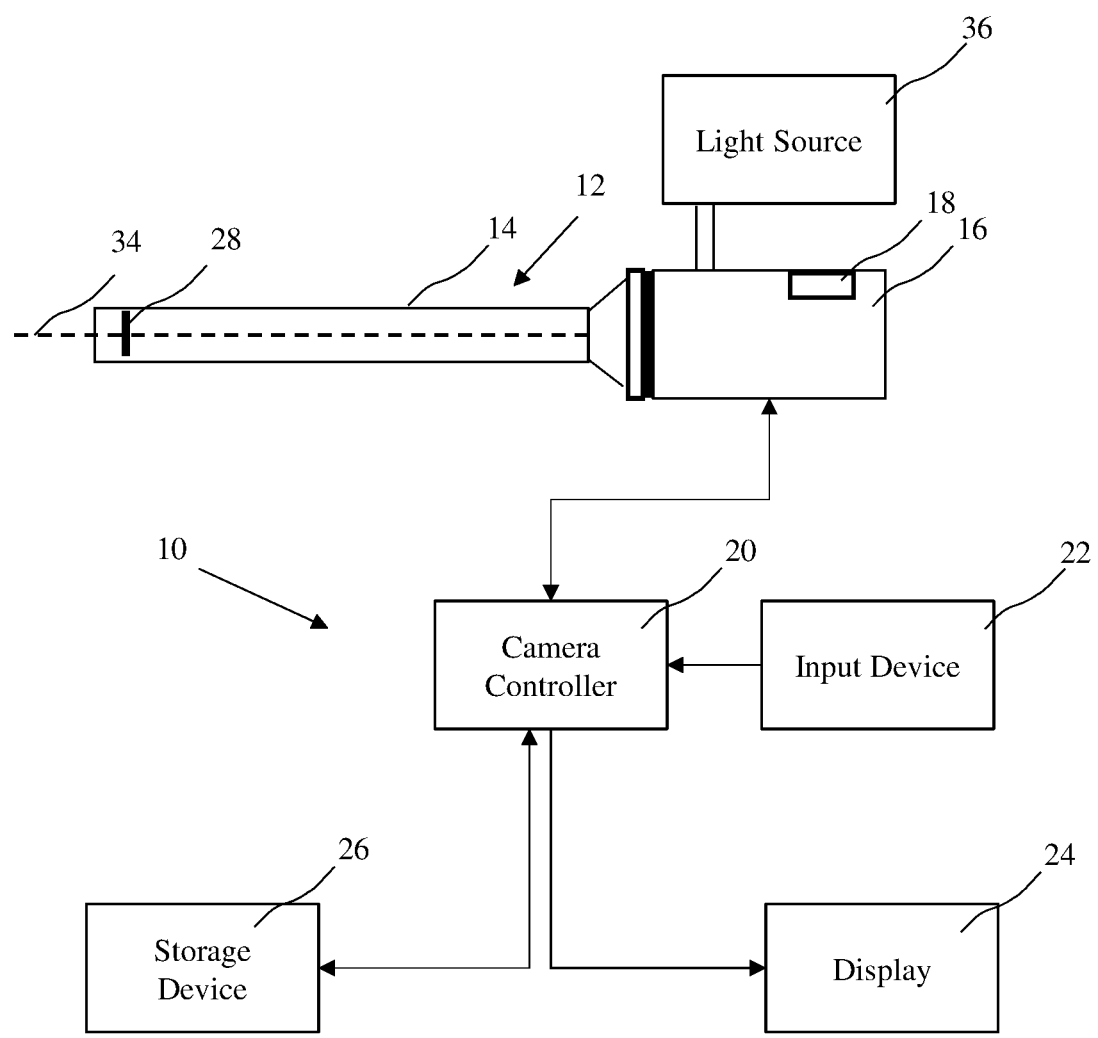
FIG. 1 is a schematic diagram of an endoscopic camera system according to an implementation.
Figure 2:
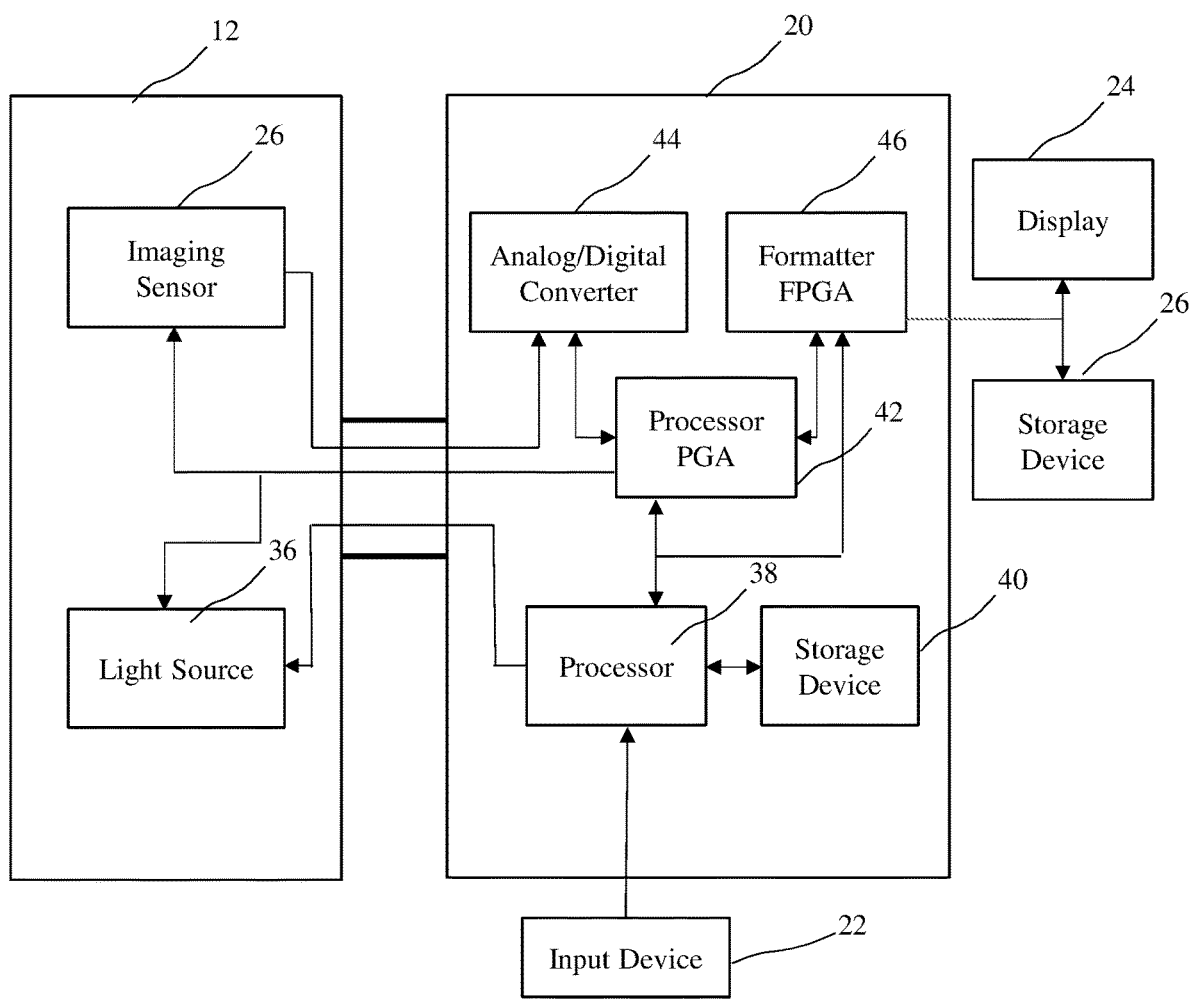
FIG. 2 is a schematic diagram of an endoscopic camera system according to an additional implementation.
Figure 3:
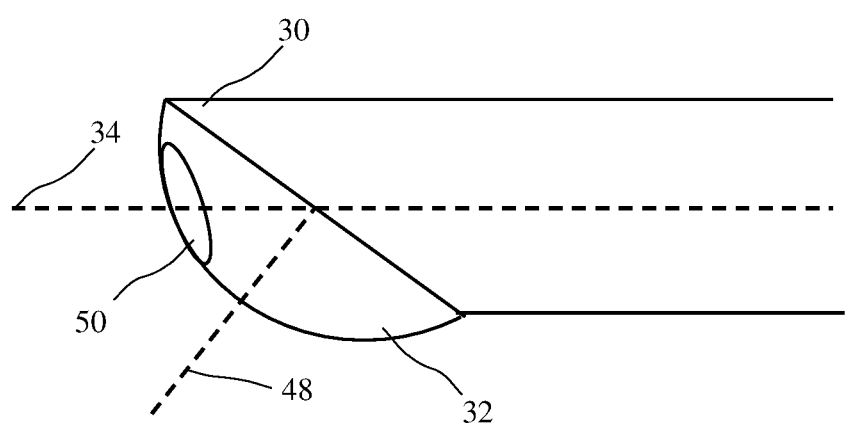
FIG. 3 is a schematic diagram of a distal portion of a camera according to an implementation.

With reference to FIGS. 1 to 3, an endoscopic camera system 10 according to an implementation has a camera 12. The camera 12 has a shaft 14 couplable to a handpiece 16. The handpiece 16 may have an input device 18, such as buttons, switches or dials. The handpiece 16 is connectable to a camera controller 20 ("CCU" or "camera controller"). The handpiece 16 and the camera controller 20 may be connected via wire to facilitate data transfer between the camera and the camera controller. The camera 12 and the camera controller 20 may also be wirelessly connected to facilitate data transfer, such as via IEEE 802.11b or IEEE 802.11n or ultra-wide band (UWB). The camera controller 20 may be connectable to at least one input device 22 such as a mouse, keyboard, touchpad, or touchscreen monitor. Additionally, the camera controller 20 may be connectable to a display 24 and a storage device 26, such as for storing images.

An image sensor 28 may be positioned inside the shaft 14 and proximal to a distal tip 30 of the shaft 12. The image sensor 28 may be, for example, a charge couple device (CCD) or complementary metal oxide semiconductor (CMOS). Optics, such as a wide angle lens 32, direct light to the image sensor 28.

The position of the image sensor 28 and optics may provide a field of view approximately along a longitudinal axis 34 of the shaft 14 (a capture angle of approximately 0 degrees relative to the longitudinal axis) so that the image field is directly in front of the distal tip of the shaft. In some implementations, the optics may provide an image at a non-zero capture angle relative to the longitudinal axis of the shaft 14. For example, the capture angle may be about 30 degrees or about 70 degrees relative to the longitudinal axis. As shown in FIG. 3, in an implementation, the optics may provide an image along an image axis 48 with a capture angle of about 45 degrees relative to the longitudinal axis 34 of the shaft 14. Additionally, the camera 12 may be coupled to a light source 36. The light source 32 may be inside of the camera 12.

The light source 36 includes a lamp. The lamp may be, for example, a semiconductor light source such as laser or LED to illuminate the field of view. The light source 36 is configured to appropriately illuminate the field of view of the video camera. Further, the light generated as well as camera sensitivity may extend beyond the visible spectrum. The illumination may be intended to excite fluorescence directly in a target, or in a fluorescent substance such as indocyanine green, that is then sensed by the camera. For example, the light source 36 might produce illumination in the near infrared (NIR) range and the camera sense the fluorescence at a longer IR wavelength. The illumination and camera sensitivity could extend from UV to NIR continuously or be composed of separate narrow bands.

Referring to FIG. 2, the camera controller 20 is preferably a programmable unit containing sufficient processing capacity to accommodate a wide range of control, user interface and image acquisition/processing functions. The camera controller 20 has a processor 38 that runs program applications providing for a variety of capabilities. For instance, an image capture and display capability allows for both display of a live feed of an image through the display 24 coupled to the camera controller 20, as well as image capture. Captured images may be stored, such as in an internal storage device 40 or external storage device 26, or transmitted to other devices.

Timing in video cameras must be very precise and consistent. A processor field programmable gate array (FPGA) 42 may be used to control and process the output from the image sensor 28. Although other controllers may be used, use of one or more FPGAs for processing video images allows the system to achieve the precise timing needed to generate a standard video output signal. User interface logic and possible external network connectivity might be performed by software running on the processor 38.

In an implementation, analog RGB data is transmitted from the image sensor 28 to the camera controller 20. The Analog RGB data passes through an Analog/Digital converter 44 to the processor FPGA 42 where the video is processed. The processed video is then passed to a video output that may include a formatter FPGA 46 where the video is formatted into various display formats. The formatter FPGA 46 may also overlay information, such as patient and/or doctor information, onto the video. The formatted video may be converted back to an analog signal for display. The formatted video is sent to the display 24 and/or the storage device 26. Alternatively, an Analog/Digital converter may be located in the camera head and digital RGB data transmitted from the camera head 12 to the camera controller 20. Additionally, the image sensor 28 itself may include an Analog/Digital converter.

The camera controller 20 issues commands to the camera 12 to adjust its operating characteristics, and the camera 12 may send confirmation to the camera controller 20 that the camera received the commands. The processor FPGA 42 and/or the processor 38 may communicate with a shutter driver either in the camera controller 20 or the camera 12 to control an exposure period of the image sensor 28. Additionally, the processor FPGA 42 and/or the processor 38 communicates with the light source 32 to control the drive current to the lamp of the light source 32.

Figure 4:
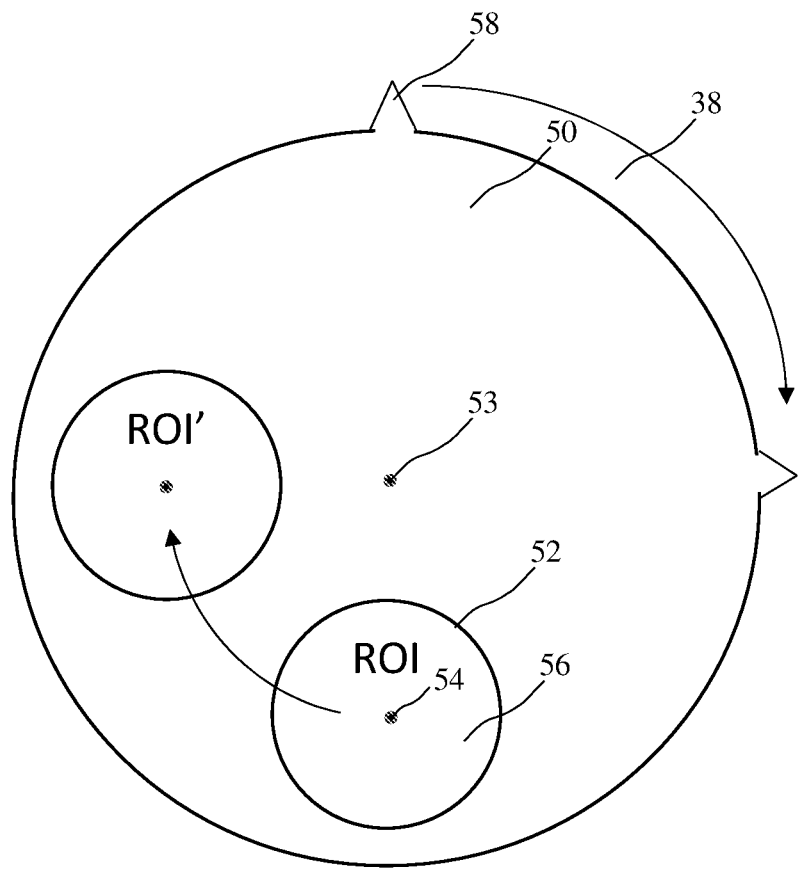
FIG. 4 illustrates a region of interest example.

As shown in FIGS. 3 and 4, the wide angle lens 32 allows for a wide angle image 50. The image may have a field of view that is greater than about 90 degrees and more preferably greater than about 140 degrees. Using an input device, such as the camera input device 18 or the camera controller input device 22, a user may select a region of interest 52 within the wide angle image 50. A user may select a region of interest 52 as desired, such as for example to magnify a portion of the wide angle image 50 or to simulate an apparent capture angle that is different than the actual capture angle. For example, and without limitation, a user may select an apparent capture angle of 30 degrees, 45 degrees or 70 degrees.

For example, as shown in FIG. 3, the camera may be configured to take a wide angle image 50 along an image axis 48 with a capture angle of about 45 degrees relative to the longitudinal axis 34. However, a user may select a region of interest 52 to simulate an endoscopic camera taking an image with a capture angle of about 30 degrees relative to the longitudinal axis. The region of interest has a center 54 and an area 56. Once the region of interest has been identified, the center 54 and area 56 are used for autoexposure correction as explained below. In some instances the region of interest will be circular and the area 56 will be calculated based on a radius of the region of interest. However, the region of interest may have different shapes.

As shown in FIG. 4, as the shaft 14 is rotated from a first position to a second position, an image center 53 does not change, but the region of interest 52 rotates along with the shaft. Once a region of interest 52 has been selected, the position of the region of interest relative to the image center 53 is known. The orientation of the scope may be obtained from an orientation indicator 58, such as a shape in a stop mask. As seen in FIG. 4, the orientation indicator 58 rotates along with the scope and may be used to track and update the position of the region of interest 52. The exposure of the region of interest is automatically updated as the scope is rotated.

Figure 5:
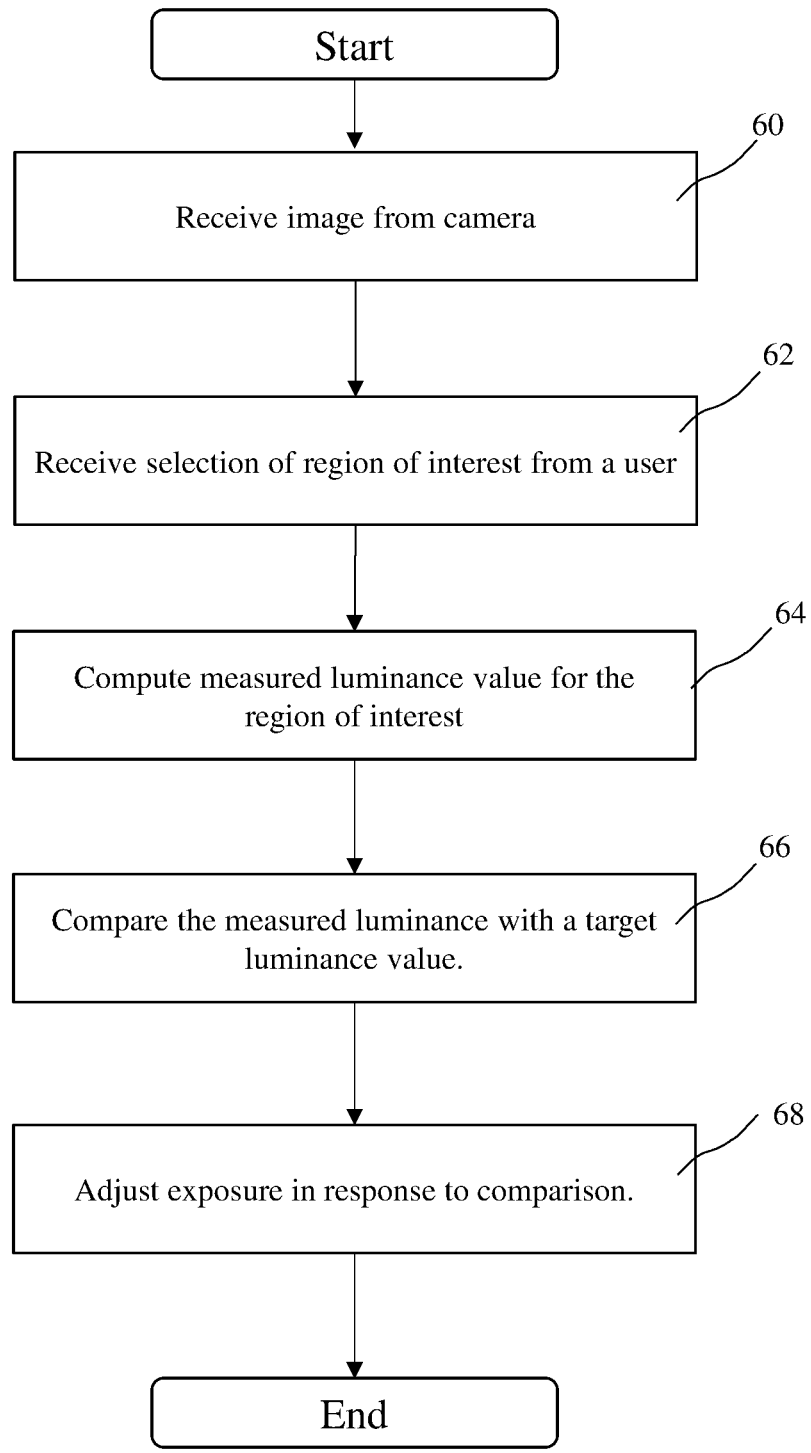
FIG. 5 is a flowchart illustrating a method of autoexposure according to an implementation.

With reference to FIG. 5, the camera controller 20 receives an image from the camera 12, step 60. The camera controller 20 further receives a region of interest identification from a user, the region of interest being a sub-part of the image, step 62. One the controller has received a region of interest identification from a user, including a center and area of the region of interest, the camera controller 20 computes the measured luminance value for the region of interest, step 64. A measured luminance value may be obtained by computing a weighted sum of at least one of an average green intensity, an average red intensity, and an average blue intensity in the region of interest. In a preferred implementation, the measured luminance value is obtained by computing a weighted sum of an average green intensity in the region of interest.

Once the measured luminance value has been computed, the measured luminance value is compared to a target luminance value, step 66. In an implementation, the target luminance value is adjustable by a user, such as by using the camera input device 18 or the camera controller input device 22.

Depending on the comparison, the camera controller adjusts exposure to move the measured luminance value closer to the target luminance value, step 68. The camera controller may adjust exposure by adjusting one or more of several variables depending on the configuration of the camera and how different the measured luminance value is from the target luminance value. For example, the camera controller 20 may adjust an exposure time of the image sensor 28. If the measured luminance value is lower than the target luminance value, then the camera controller 20 may increase the exposure time to increase the measured luminance value. If the measured luminance value is higher than the target luminance value, then the camera controller 20 my decrease the exposure time.

Additionally, the camera controller 20 may adjust an intensity of the light source 36. If the measured luminance value is lower than the target luminance value, then the camera controller 20 my increase the intensity of the light source time to increase the measured luminance value. If the measured luminance value is higher than the target luminance value, then the camera controller 20 my decrease the intensity of the light source.

Additionally, the camera controller 20 may adjust a digital gain applied to the acquired image. If the measured luminance value is lower than the target luminance value, then the camera controller 20 my increase the digital gain applied to the acquired image to increase the measured luminance value. If the measured luminance value is higher than the target luminance value, then the camera controller 20 my decrease the digital gain.

Additionally, if the camera has a variable aperture controlling the amount of light reaching the image sensor 28, then the camera controller may control the variable aperture to alter the amount of light reaching the image sensor. If the measured luminance value is lower than the target luminance value, then the camera controller 20 my increase the aperture size to allow more light to reach the image sensor 28 to increase the measured luminance value. If the measured luminance value is higher than the target luminance value, then the camera controller 20 my decrease the aperture size to allow less light to reach the image sensor. Additionally, the camera controller 20 may adjust the sensitivity of the image sensor 28.

The camera controller 20 may need to adjust multiple parameters. For example, if the camera controller 20 has already increased the exposure time to a maximum possible exposure time and the measured luminance value is still less than a target luminance value, then the camera controller may adjust another parameter, such as digital gain, to further increase measured luminance value.

In an implementation, known camera spatial lighting characteristics are further considered in adjusting exposure, and exposure correction is non-uniform across the region of interest. For example, if a camera 12 is known to have reduced light toward a periphery of a wide angle image, a gradient may be calculated and applied to alter autoexposure settings. If a selected region of interest includes pixels near the periphery of the wide angle image, then pixels within the region of interest nearer to the periphery may be provided with increased digital gain. In an implementation, a gradient is applied depending on how far each pixel of the region of interest is from the center of the wide angle image.

There is disclosed in the above description and the drawings, a surgical imaging system and method that fully and effectively overcomes the disadvantages associated with the prior art. However, it will be apparent that variations and modifications of the disclosed implementations may be made without departing from the principles of the invention. The presentation of the implementations herein is offered by way of example only and not limitation, with a true scope and spirit of the invention being indicated by the following claims.

Any element in a claim that does not explicitly state "means" for performing a specified function or "step" for performing a specified function, should not be interpreted as a "means" or "step" clause as specified in 35 U.S.C. § 112.

What is claimed is:

1. An endoscopic camera system comprising:
   a camera that captures and outputs an image;
   a camera controller coupled to the camera; and
   a user input device coupled to the camera or the camera controller, wherein the user input device is usable to select a region of interest in the image, the region of interest being a sub-part of the image;
   wherein the camera controller:
   computes a measured luminance value for the region of interest; and
   adjusts an exposure in response to a comparison of the measured luminance value with a target luminance value; and
   wherein:
   the image further comprises an image center and an orientation indicator;

the region of interest has a region of interest center positioned at a fixed distance from the image center, and the camera controller changes the region of interest center based on changes in position of the orientation indicator.

2. The system of claim 1, wherein the luminance value is a weighted sum of at least one of: an average green intensity, an average red intensity, and an average blue intensity in the region of the interest.

3. The system of claim 1, wherein the luminance value is a weighted sum of an average green intensity in the region of the interest.

4. The system of claim 1, wherein adjusting the exposure further comprises adjusting at least one of an exposure time, a light source intensity, a gain, a sensitivity, and a variable aperture.

5. The system of claim 1, wherein the camera has a longitudinal axis and captures the image at a non-zero angle to the longitudinal axis.

6. The system of claim 5 wherein the camera captures the image at a capture angle of 45 degrees relative to the longitudinal axis.

7. The system of claim 5 wherein the user input device is usable to select a region of interest having an apparent capture angle that is different than the actual capture angle.

8. The system of claim 1 wherein the camera captures and outputs an image having a field of view greater than 90 degrees.

9. The system of claim 8 wherein the user input device is usable to select a region of interest having an apparent field of view that is smaller than the image field of view.

10. The system of claim 1 wherein adjusting the exposure further comprises adjusting a gain of at least some pixels within the region of interest.

11. The system of claim 10 wherein the gain adjustment is not uniform across all of the pixels within the region of interest.

12. An endoscopic camera system comprising:
a camera that captures and outputs an image;
a camera controller coupled to the camera; and
a user input device coupled to the camera or the camera controller, wherein the user input device is usable to select a region of interest in the image, the region of interest being a sub-part of the image;
wherein the camera controller;
computes a measured luminance value for the region of interest; and
adjusts an exposure in response to a comparison of the measured luminance value with a target luminance value;
wherein adjusting the exposure further comprises adjusting a gain of at least some pixels within the region of interest;
wherein the gain adjustment is not uniform across all of the pixels within the region of interest; and wherein pixel gains are adjusted using a gradient depending on a position of the pixels from a center of the image.

13. A method of adjusting an exposure for an imaging system, comprising:
receiving an image from a camera;
receiving a region of interest in the image from a user, the region of interest being a sub-part of the image;
computing a measured luminance value for the region of interest; and
adjusting an exposure in response to a comparison of the measured luminance value with a target luminance value;
wherein:
the image further comprises an image center and an orientation indicator;
the region of interest has a region of interest center positioned at a fixed distance from the image center; and
the method further comprises calculating a new region of interest center based on a change in a position of the orientation indicator.

14. The method of claim 13, wherein computing the measured luminance value further comprises computing a weighted sum of an average green intensity, an average red intensity, and an average blue intensity in the region of the interest.

15. The method of claim 13, wherein computing the measured luminance value further comprises computing a weighted sum of an average green intensity in the region of interest.

16. The method of claim 13, wherein adjusting the exposure further comprises adjusting at least one of an exposure time, a light source intensity, a gain, a sensitivity, and a variable aperture.

17. The method of claim 13, wherein the image is captured at an actual capture angle greater than zero relative to a longitudinal axis and wherein the received region of interest has an apparent capture angle that is different than the actual capture angle.

18. The method of claim 13 wherein the image has a field of view greater than 90 degrees and wherein the received region of interest has an apparent field of view that is less than the image field of view.

19. The method of claim 13 wherein adjusting the exposure further comprises adjusting a gain of at least some pixels within the region of interest.

20. The method of claim 13 wherein the gain adjustment is not uniform across all of the pixels within the region of interest.

21. The method of claim 19 wherein pixel gains are adjusted using a gradient depending on a position of the pixels from a center of the image.

* * * * *